US008829897B2

(12) United States Patent
Vienneau et al.

(10) Patent No.: US 8,829,897 B2
(45) Date of Patent: Sep. 9, 2014

(54) PAPER POSITION SENSOR FOR PRINTER

(75) Inventors: Michel Vienneau, Dieppe (CA); Paul Butland, Dieppe (CA); Yvon Hache, Dieppe (CA); Sylvio LeBlanc, Dieppe (CA); Denis Daigle, Dieppe (CA)

(73) Assignee: Nanoptix Inc., Dieppe (CA)

( * ) Notice: Subject to any disclaimer, the term of this patent is extended or adjusted under 35 U.S.C. 154(b) by 795 days.

(21) Appl. No.: 13/102,590

(22) Filed: May 6, 2011

(65) Prior Publication Data

US 2011/0273167 A1 Nov. 10, 2011

Related U.S. Application Data

(60) Provisional application No. 61/332,017, filed on May 6, 2010.

(51) Int. Cl.

*G01B 7/30* (2006.01)
*B41J 11/00* (2006.01)
*B41J 3/407* (2006.01)

(52) U.S. Cl.

CPC ................ *B41J 3/407* (2013.01); *B41J 11/008* (2013.01); *B41J 11/0095* (2013.01)
USPC .................. 324/207.25; 324/207.13; 399/371

(58) Field of Classification Search
None
See application file for complete search history.

(56) References Cited

U.S. PATENT DOCUMENTS 5,041,850 A * 8/1991 Kahoyashi et al. ........... 347/157
6,575,090 B1 * 6/2003 Vienneau et al. ............... 101/66
6,633,740 B2 * 10/2003 Estabrooks ................... 399/384

* cited by examiner

*Primary Examiner* — Minh N Tang
(74) *Attorney, Agent, or Firm* — Sughrue Mion, PLLC

(57) ABSTRACT

A paper position sensor for a ticket printer is disclosed. The ticket printer includes a blank ticket tray and a paper guide consisting of an upper and lower guide, which lower guide contains a position sensor wheel that rotates as a result of the frictional contact with the blank ticket, as the ticket passes over the sensor wheel on its way through the guides. The wheel contains an embedded magnetic element such that as the wheel turns, which magnetically provides rotational position information to an adjacently-mounted sensor chip, which is able to determine, magnetically, the position of the wheel. The sensor chip provides data to the printer control as to the position of the ticket through the printer, and thus the printer control is now able to determine the precise position of the ticket in the printer.

9 Claims, 7 Drawing Sheets

PAPER POSITION SENSOR FOR PRINTER

FIELD OF THE INVENTION

The present invention relates to printers and more specifically to a sensor for determining paper position within a gaming machine printer.

BACKGROUND OF THE INVENTION

In a printer in gaming applications, such as casinos, a ticket being printed is valid when the validation number is successfully printed out, whether or not the rest of the ticket printed successfully or not. Once the validation number is printed, the central system determines that this ticket is valid even though the remaining ticket could be blank. This valid ticket may now be cashed in, and the gaming institution provides money to the player. However, if the number is not successfully printed, then the ticket is not valid, and the player cannot collect their money. Therefore it is important to know the position of the ticket within the printer, and whether or not the validation number has been printed on the ticket.

It is generally difficult to know the position of the paper within a printer, and paper tracking has been limited to sensors at fixed distances in the paper path detecting black marks or paper edges. If the operator pulls or holds the paper, he or she may create a paper jam. There is a possibility that the paper jam occurs right before or after the printing of the validation number on the ticket. If the exact position of the ticket within the printer is known, then it may also be known whether the validation number has been printed.

Prior attempts have been made to determine the position of paper within a printer, for example, in U.S. Pat. No. 4,690,577 (Kikuchi) a mechanical sensor lever is employed to determine the presence of paper in the paper path. In U.S. Pat. No. 5,132,531 (Duncan) an optoelectric position-sensitive detector using projected light is disclosed, which may be used to determine the presence of paper within a paper path. In U.S. Pat. No. 5,507,583 (Beaty), the invention describes an infrared light to determine when label stock is in position for printing. In U.S. Pat. No. 5,041,850 (Kahoyashi) a position sensor employs a photoelectric transducer element which detects paper position, and the presence and position of labels, by changes in transmissivity of the light. In U.S. Pat. No. 5,988,905 (Abe) the use of light is also described as a manner to determine the paper position with a sensor which is transversely displaceable.

In U.S. Pat. No. 6,672,705 (Kitahara), the belt speed/position sensor detects the number of mark lines that have passed as the count is initiated by the paper tip. By knowing the number of mark lines, the sensor also knows the position of the paper. In U.S. Pat. No. 6,609,844 (Petteruti et al) the position of the centering mechanism may be magnetically encoded, and a sensor reads the encoded position of the centering mechanism.

In U.S. Pat. No. 7,198,265 (Chelvayohan), a media sensor device, composed of a light reflectance sensor, is mounted to the drive shaft, wherein as the drive shaft is rotated one in one direction, the sensor is moved out into the paper path, and if the drive shaft is rotated in the opposite direction, the sensor is moved outside of the paper path. In U.S. Pat. No. 6,914,684 (Bolash), non-linear characteristics of light sensors are used to detect the media-type, such that a ratio between two sensors accurately determines the glossiness and presence of the media.

Although there has been some prior art in the way of position sensors for paper or tickets that are being fed through a printer, it has largely revolved around optical sensors which sense a page beginning or ending or through the use of markings on the page to know the position. It is valuable to know the position of the paper or ticket, to avoid paper jams and malfunctions, as well as facilitating movement back and forth of the paper or ticket under the print head. Since there is no effective solution to know the position of a paper or ticket without markings on the paper, there is therefore a need for an economical and practical solution to determining the paper position within the printer.

SUMMARY OF THE INVENTION

The present invention describes a paper position sensor for a printer comprising of several elements. First, of a paper guide comprising an upper guide and a lower guide, defining a paper path therebetween. Second, of a position sensor wheel having a magnetic element, the wheel rotatably connected to said paper guide and positioned so as to engage a paper passing through the paper guide. Third, of a sensor chip positioned adjacent to said sensor wheel, the sensor chip sensing the magnetic element on the sensor wheel wherein said sensor wheel is frictionally engaged and rotated by movement of a paper through the paper guide along the paper path, and said sensor chip calculates the rotational position of said sensor wheel.

The present invention also describes the paper position sensor of claim 1, wherein said position sensor wheel is rotatably embedded within said paper guide.

The present invention also describes the paper position sensor of claim 1, wherein said position sensor wheel contains an embedded magnetic element.

The present invention also describes the paper position sensor of claim 1, wherein the lower guide has a plurality of lower fins.

The present invention also describes the paper position sensor of claim 4, wherein each lower fin has a leading arcuate crest and a trailing concave region.

The present invention also describes the paper position sensor of claim 1, wherein the upper guide has a plurality of arcuately-projecting upper fins.

The present invention also describes the paper position sensor of claim 4, wherein the position sensor wheel is mounted within a centrally-positioned lower fin.

The present invention also describes the paper position sensor of claim 1, wherein the position sensor wheel further comprises a friction-enhancing agent at its edge.

The present invention also describes the paper position sensor of claim 8, wherein the friction-enhancing agent is rubber, plastic or a serrated edge.

BRIEF DESCRIPTION OF THE DRAWINGS

It will now be convenient to describe the invention with particular reference to one embodiment of the present invention. It will be appreciated that the diagrams relate to one embodiment of the present invention only and are not to be taken as limiting the invention.

DETAILED DESCRIPTION OF THE DRAWINGS

The present invention will now be described more fully hereinafter with reference to the accompanying drawings, in which preferred and other embodiments of the invention are shown. No embodiment described below limits any claimed invention and any claimed invention may cover processes or apparatuses that are not described below. The claimed inventions are not limited to apparatuses or processes having all the features of any one apparatus or process described below or to features common to multiple or all of the apparatuses described below. It is possible that an apparatus or process described below is not an embodiment of any claimed invention. The Applicants, inventors or owners reserve all rights that they may have in any invention claimed in this document, for example the right to claim such an invention in a continuing application and do not intend to abandon, disclaim or dedicate to the public any such invention by its disclosure in this document.

Figure 1:
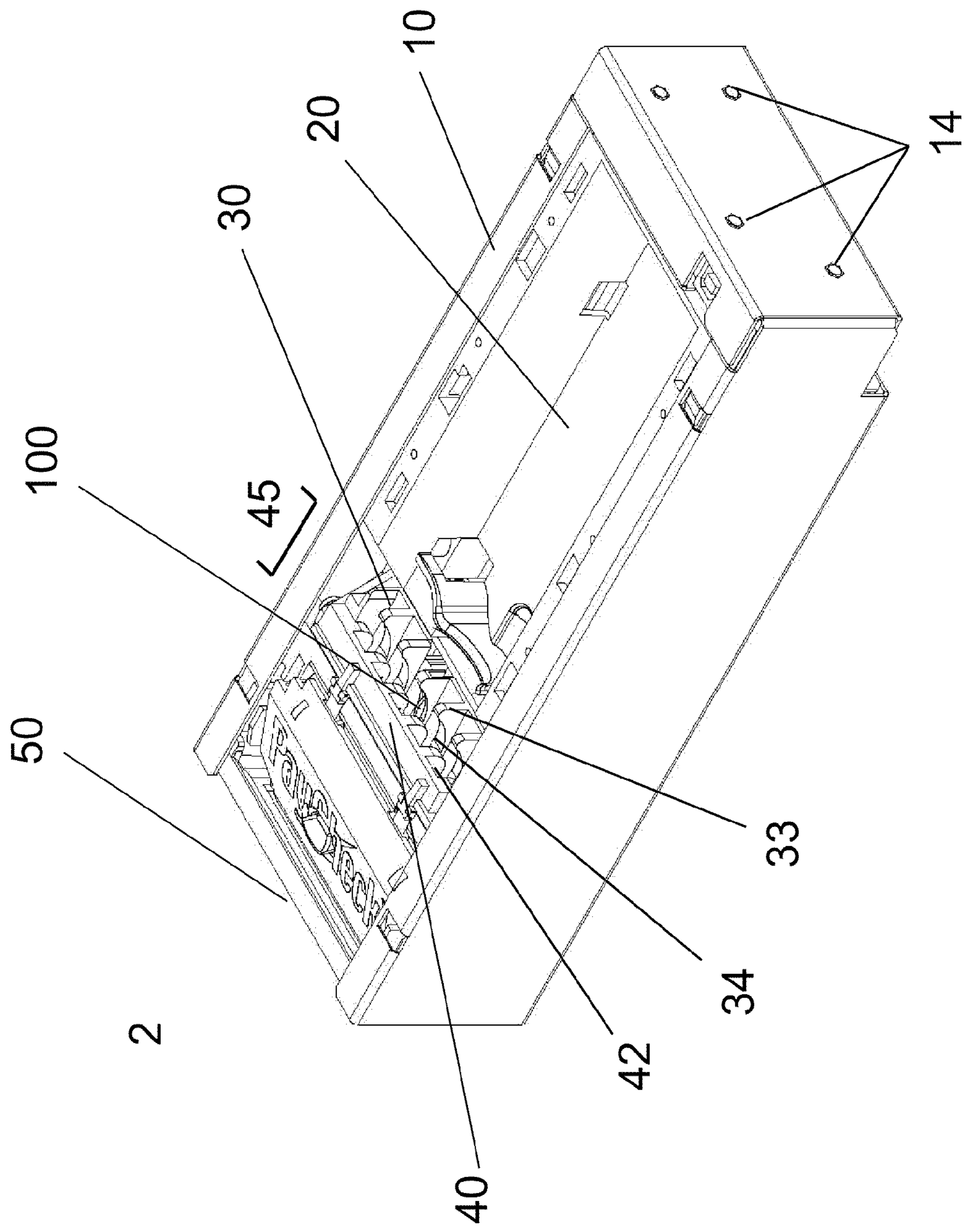
FIG. 1 is a perspective view of the gaming machine printer according to one embodiment of the present invention.
Figure 2:
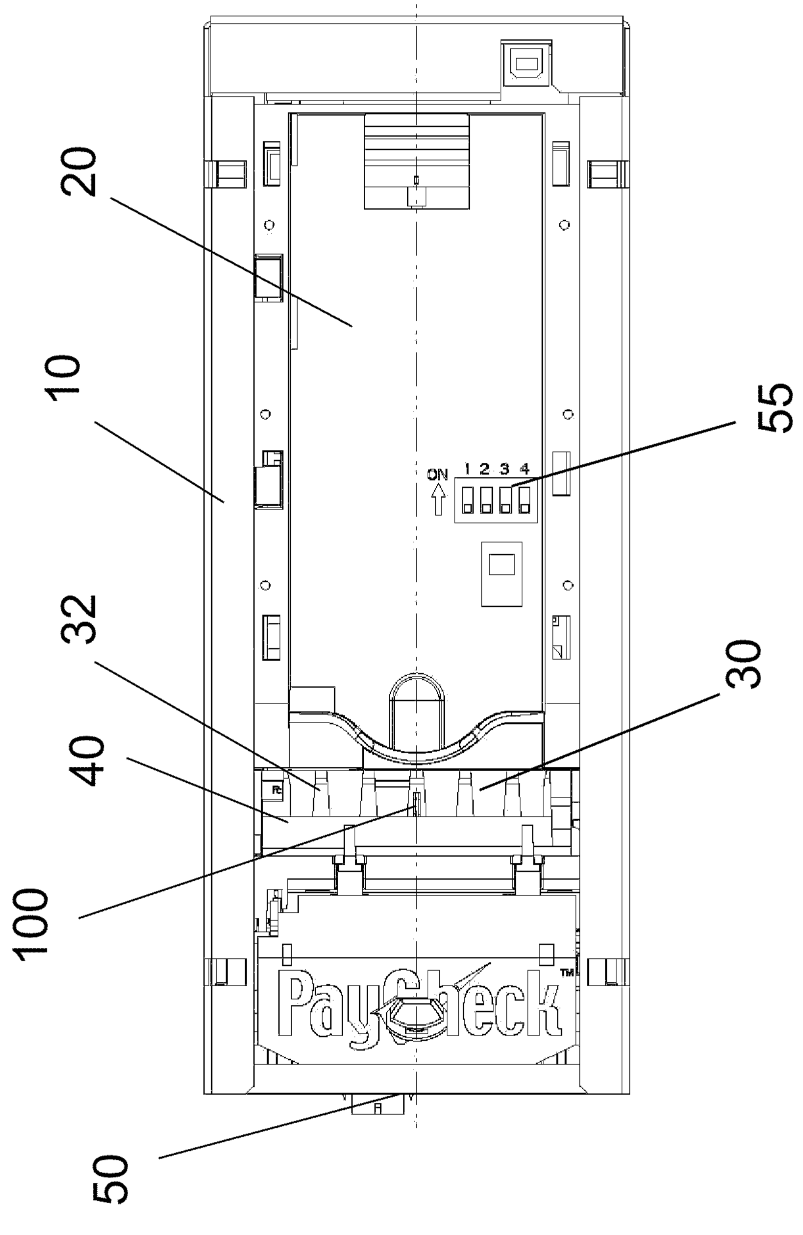
FIG. 2 is a top plan view of the gaming machine printer according to one embodiment of the present invention.
Figure 3:
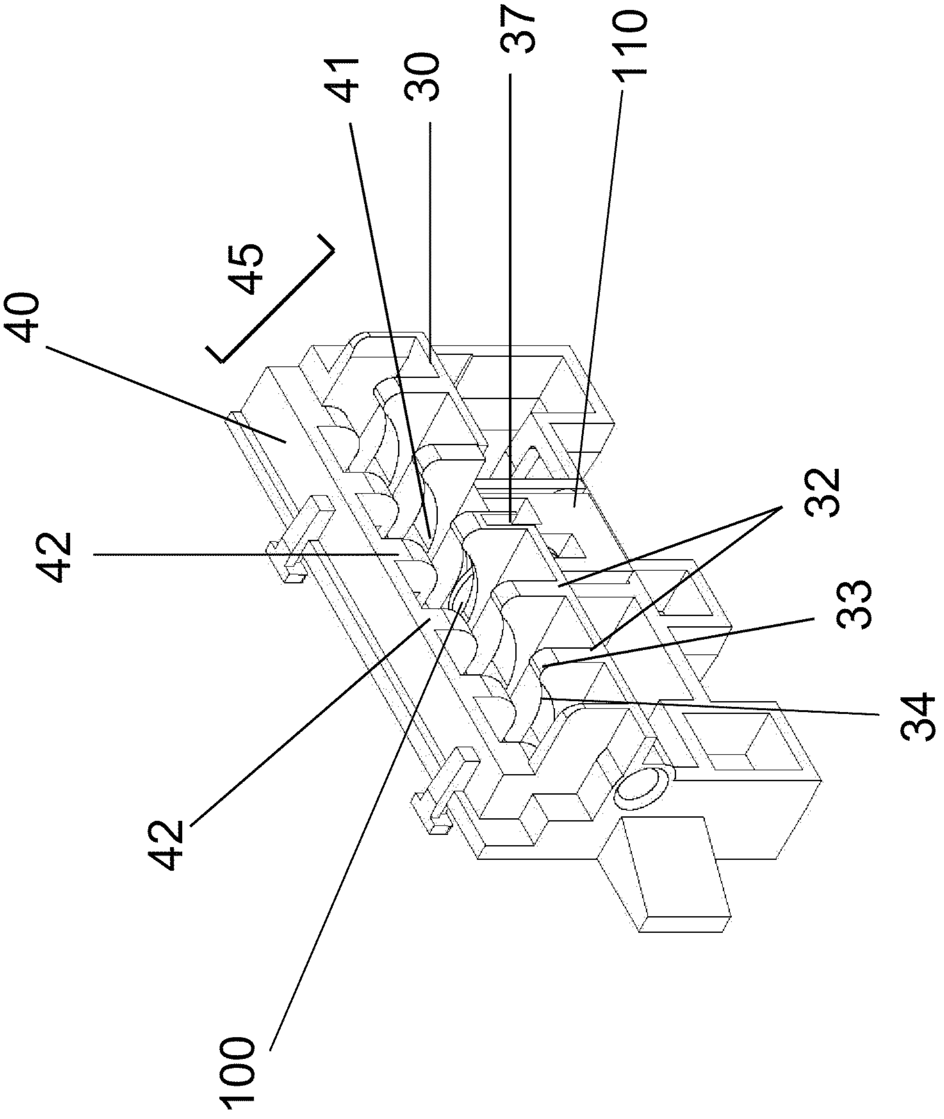
FIG. 3 is a perspective view of the paper position sensor mounted within the bezel according to one embodiment of the present invention.

With reference to FIGS. 1, 2, and 3 and according to one embodiment of the present invention, the printer 2 is shown from a perspective view and from above, respectively. The printer may be of any variety, however in the present embodiment the printer prints tickets for gaming machines, such as slot machines or poker machines. The workpiece of the invention is a ticket. The ticket printer consists of a frame 10, which holds all the printer components, and is adapted to be mounted within a gaming machine by means of mounting holes 14. One skilled in the art would appreciate that the mounting holes 14 may vary in position and size, according to the internal mounts of the gaming machine into which the printer 2 is designed to fit. The printer components include a blank ticket tray 20, which is of the appropriate size to hold the ticket; a bezel 45 for receiving the paper ticket, the bezel consisting of a lower guide 30 and upper guide 40, defining a paper path 41 therebetween. The paper is guided by the lower guide 30 and upper guide 40 to pass through the paper path 41. The lower guide 30 is formed of a plurality of lower fins 32, in the present embodiment five lower fins 32 are present. Each of the lower fins 32 is in a wave-shape when viewed from the side, that is there is a leading arcuate crest 33, and a trailing concave region 34, the crest 33 for receiving the paper ticket (not shown) initially, after which the ticket (not shown) is guided by the trailing region 34. The upper guide 40 also has a plurality of downwardly-oriented arcuately-projecting upper fins 42, the number corresponding to the number of lower fins 32. Positioned at or near the center of the lower guide 30 is a position sensor wheel 100 oriented in line with the paper path, which sensor wheel is capable of rotating as a result of the frictional contact with the blank ticket, which passes over the sensor wheel 100 on the ticket's way through the lower and upper guides 30, 40. In one embodiment, the sensor wheel 100 is mounted within the lower fin 32 that is most centrally-positioned, and for this purpose the central lower fin 32 has a hollow 37 therein. The ticket (not shown) moves from the ticket tray 20, through the space between the lower and upper guides 30, 40, through the print heads (not shown) which place ink on the ticket, and is passed out of the printer by means of the ticket return (not shown) 50. The components are held within the frame 10 by fastening means (not shown) that may consist of rivets or tabs (not shown) that may be passed through one or more slots or holes (not shown) in the frame 10, or any other number of fastening devices well-known to those skilled in the art. With reference to FIG. 2, DIP switches 55 are positioned within the paper tray 20, which can be adjusted to change settings of the printer.

Figure 4:
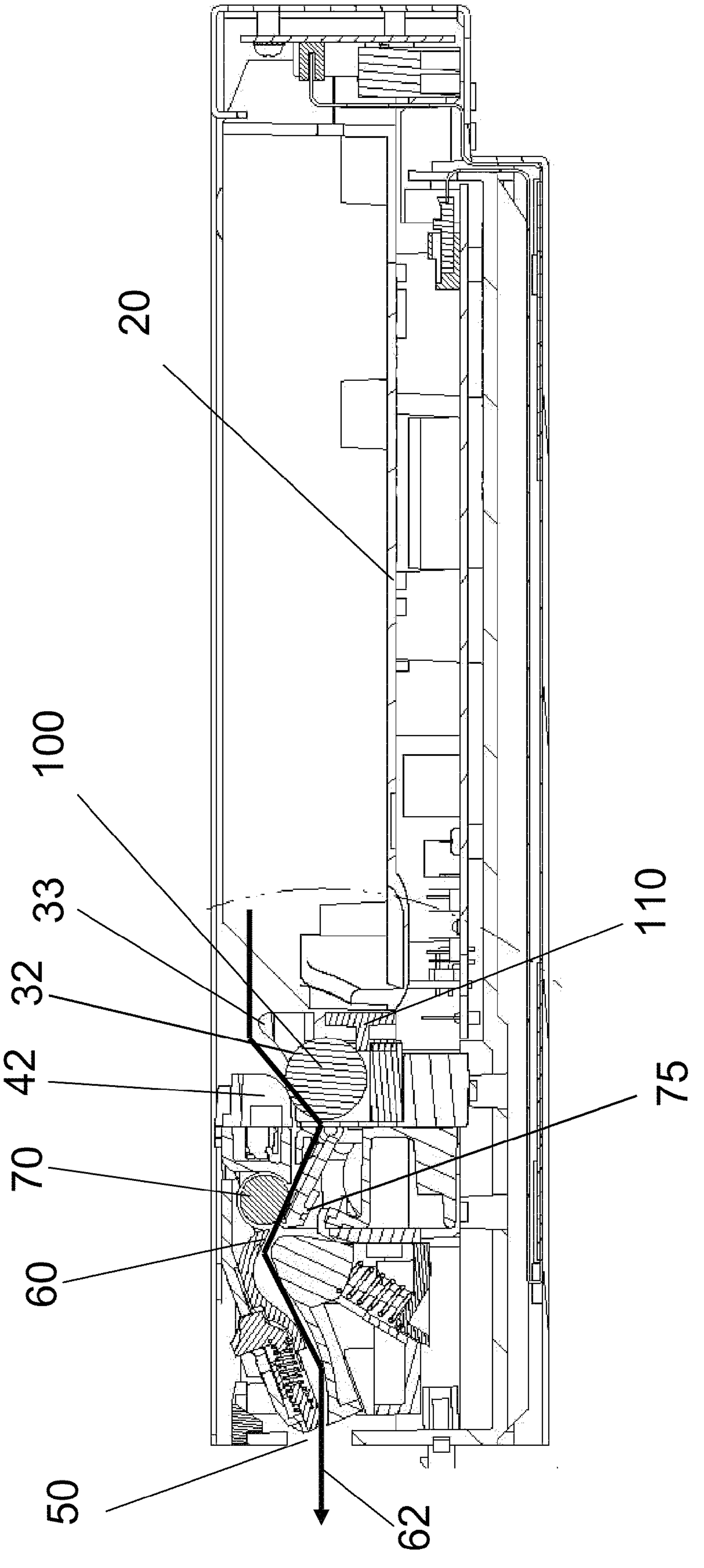
FIG. 4 is a cut-away elevation view of the gaming machine printer according to one embodiment of the present invention.
Figure 5:
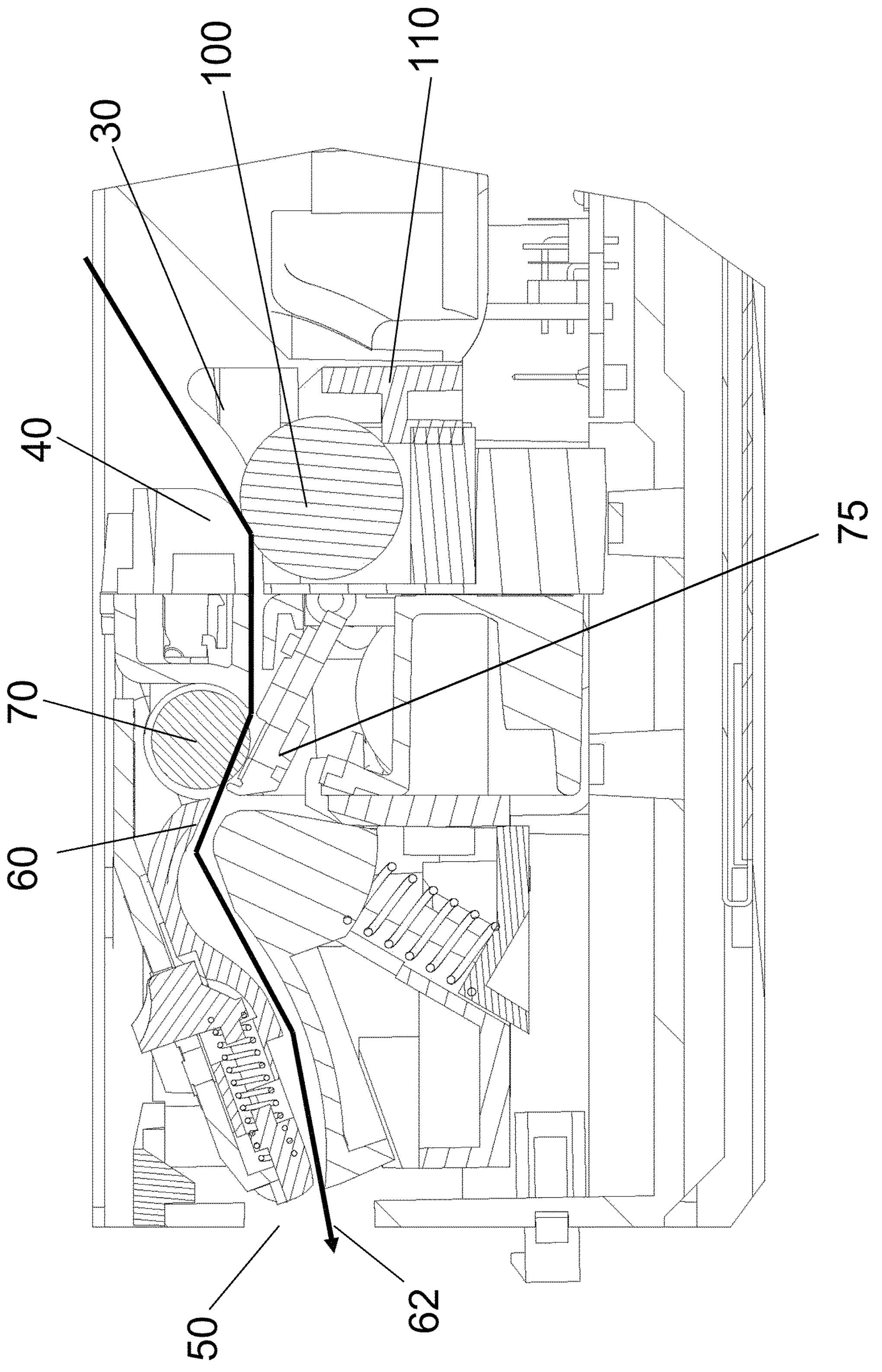
FIG. 5 is a detail view of the paper path through the paper position sensor according to one embodiment of the present invention.

With reference to FIGS. 4 and 5, and according to one embodiment of the invention, the ticket path 60 is shown by bold line 62 passing through a printer within a gaming machine. The ticket (not shown) travels from the ticket tray 20 between the lower and upper guides 30, 40. As it is passing between the guides 30, 40 it is guided by the fins 32, 42 through the passage between the guides 30, 40. It touches upon and rotates the position sensor wheel 100, which is mounted within the frame 10 with the other components by means of the housing 125. The ticket (not shown) then proceeds along the ticket path 60 and past ticket guide wheel 70, and past the print head 75 as the ticket (not shown) proceeds to egress from the ticket return 50.

Figure 6:
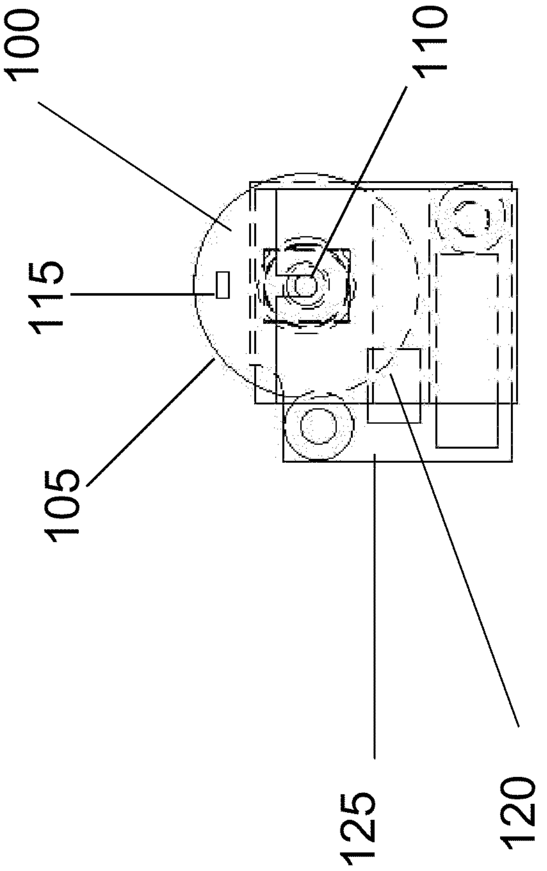
FIG. 6 is a perspective view of the paper position sensor, according to one embodiment of the present invention.

As shown in FIGS. 3 and 6, and according to one embodiment of the invention, the position sensor wheel 100 turns on its axle 110 mounted in a housing 125 as the paper passes through the lower and upper guides 30, 40, as it brushes the edge 105 of the sensor wheel 100, which may be coated with a friction-enhancing agent such as rubber or plastic, or may be serrated to increase friction with the paper ticket (not shown). The wheel 100 has an attached or embedded magnetic element 115 such that as the wheel 100 turns, the element 115 magnetically provides rotational position information to an adjacently-mounted sensor chip 120 (such as the Austria Micro Systems™ AS5040 10-bit 360° Programmable Magnetic Rotary Encoder) which is able to determine, magnetically, the position of the wheel to within approximately 0.35° (or 1024 positions per revolution). The sensor chip 120 provides data to the printer control (not shown) as to the position of the ticket through the printer. The data provided to the printer control (not shown) is for example the number of revolutions the wheel 100 has undergone as well as how many degrees of rotation the wheel has to complete for the last revolution for the printing of a ticket (within a tolerance of 0.35°). With such data the printer control module (not shown) is able to determine the precise distance a ticket has traveled past the wheel 100, therefore how much of the ticket has passed the bezel 45, and is then able to make a determination as to how far the ticket has progressed through the printer, and how much of the ticket (not shown) remains to be printed on. By knowing the position of the ticket through the printer, the printer control module (not shown), knowing the ticket layout, can calculate whether or not certain characters or graphics have been printed, and whether, despite a flaw in printing, the ticket is valid for its purpose or not. In particular, a unique identifier such as a serial number may make the ticket valid, and if this has been printed the need for a reprinted ticket is obviated. The position wheel 100 and sensor chip 120 are mounted in the housing 125 which is in turn mounted within the lower guide 30, preferably within one of the fins 32.

Figure 7:
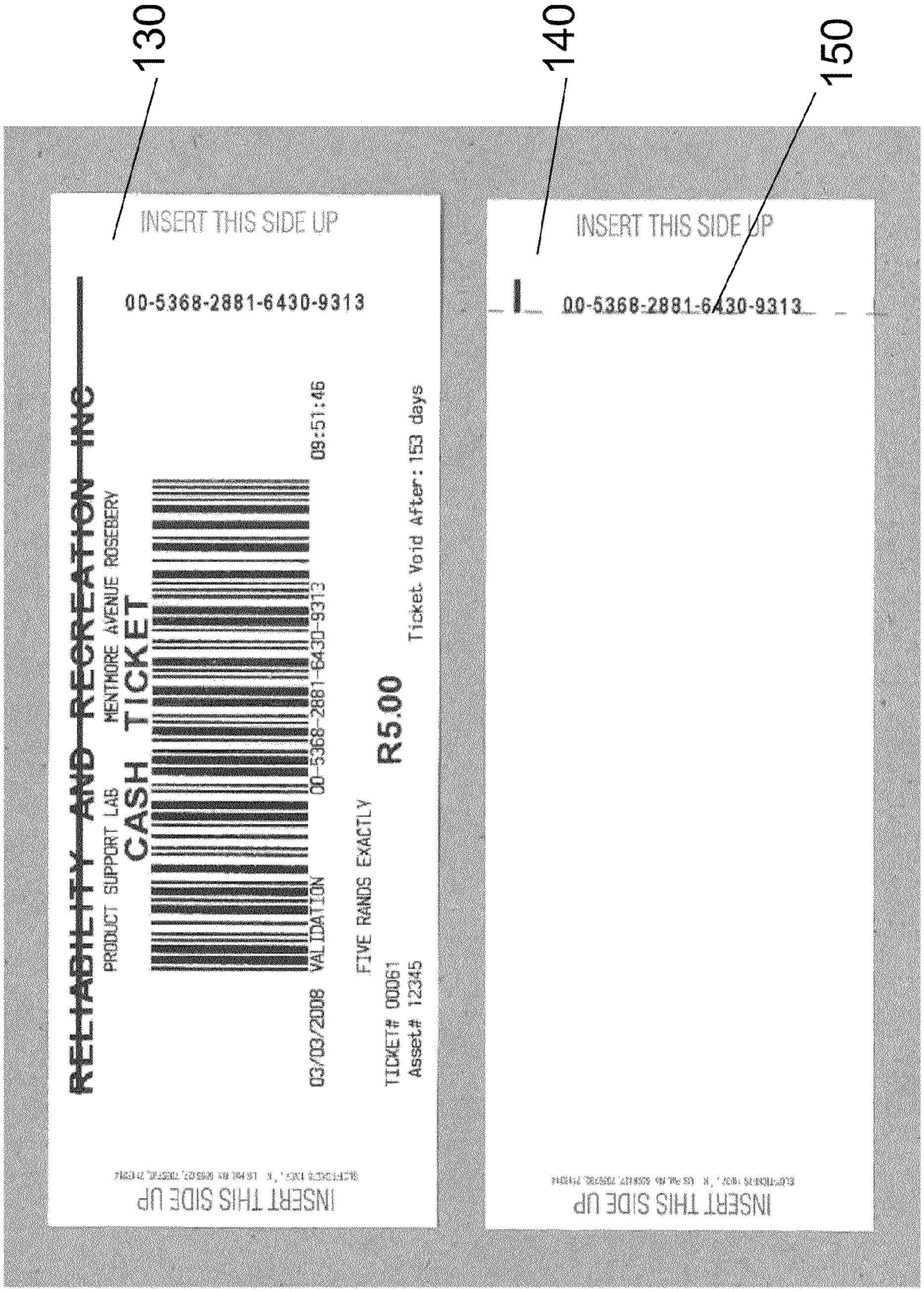
FIG. 7 is a view of a sample completely printed ticket, and a partially printed ticket from a gaming.

FIG. 7 shows a completely printed ticket 130, and a partially printed ticket 140, which only contains the serial number 150, before the printing is interrupted. The presence of serial number 150 renders the partially printed ticket as a valid ticket and may be reimbursed for cash at the cashier. Through the use of the present invention, the printer control is able to determine in advance that the partially printed ticket is valid and there is no need for printing a replacement ticket.

Many modifications and other embodiments of the invention will come to the mind of a person skilled in the art having the benefit of the teachings presented in the foregoing description and associated drawings. Therefore, it is understood that the invention is not to be limited to the specific embodiment disclosed, and that modifications and embodiments are intended to be included within the scope of the appended claims.

The invention claimed is:

1. A paper position sensor for a printer, comprising:

a) a paper guide comprising an upper guide and a lower guide, defining a paper path therebetween;

b) a position sensor wheel having a magnetic element, the wheel rotatably connected to said paper guide and positioned so as to engage a paper passing through the paper guide; and c) a sensor chip positioned adjacent to said sensor wheel, the sensor chip sensing the magnetic element on the sensor wheel wherein said sensor wheel is frictionally engaged and rotated by movement of a paper through the paper guide along the paper path, and said sensor chip calculates the rotational position of said sensor wheel.

2. The paper position sensor of claim 1, wherein said position sensor wheel is rotatably embedded within said paper guide.

3. The paper position sensor of claim 1, wherein said position sensor wheel contains an embedded magnetic element.

4. The paper position sensor of claim 1, wherein the lower guide has a plurality of lower fins.

5. The paper position sensor of claim 4, wherein each lower fin has a leading arcuate crest and a trailing concave region.

6. The paper position sensor of claim 1, wherein the upper guide has a plurality of arcuately-projecting upper fins.

7. The paper position sensor of claim 4, wherein the position sensor wheel is mounted within a centrally-positioned lower fin.

8. The paper position sensor of claim 1, wherein the position sensor wheel further comprises a friction-enhancing agent at its edge.

9. The paper position sensor of claim 8, wherein the friction-enhancing agent is rubber, plastic or a serrated edge.

* * * * *